(12) United States Patent
Vinci et al.

(10) Patent No.: US 11,214,717 B2
(45) Date of Patent: Jan. 4, 2022

(54) HIGH EFFICIENCY LAMINATING ADHESIVE FORMULATIONS WITH IMPROVED REACTIVITY PROFILE

(71) Applicant: Dow Global Technologies LLC, Midland, MI (US)

(72) Inventors: Daniele Vinci, Lucerne (CH); Elodie Hablot, Zurich (CH); Thorsten Schmidt, Richterswil (CH)

(73) Assignee: Dow Global Technologies LLC, Midland, MI (US)

( * ) Notice: Subject to any disclaimer, the term of this patent is extended or adjusted under 35 U.S.C. 154(b) by 65 days.

(21) Appl. No.: 16/089,422

(22) PCT Filed: Jan. 25, 2017

(86) PCT No.: PCT/US2017/014802
§ 371 (c)(1),
(2) Date: Sep. 28, 2018

(87) PCT Pub. No.: WO2017/171996
PCT Pub. Date: Oct. 5, 2017

(65) Prior Publication Data
US 2019/0119536 A1  Apr. 25, 2019

Related U.S. Application Data

(60) Provisional application No. 62/314,484, filed on Mar. 29, 2016.

(51) Int. Cl.
*C09J 175/08* (2006.01)
*C08G 18/48* (2006.01)
(Continued)

(52) U.S. Cl.
CPC ............... *C09J 175/08* (2013.01); *B32B 7/12* (2013.01); *B32B 15/08* (2013.01); *B32B 15/12* (2013.01);
(Continued)

(58) Field of Classification Search
CPC ......... C09J 175/08; C09J 175/04; B32B 7/12; B32B 15/08; B32B 15/12; B32B 27/08;
(Continued)

(56) References Cited

U.S. PATENT DOCUMENTS

| 4,521,545 A | 6/1985 | Kerimis et al. |
| 4,524,104 A | 6/1985 | Hagio et al. |

(Continued)

FOREIGN PATENT DOCUMENTS

EP  2465886 A1  6/2012

OTHER PUBLICATIONS

L. Phan, et al., Switable solvents consisting of amidine/alcohol or Guanidine/Alcohol mixtures, Ind. Eng. Chem. Res. 2008, 539-545, vol. 47.
(Continued)

*Primary Examiner* — Shane Fang
(74) *Attorney, Agent, or Firm* — William Hales

(57) ABSTRACT

An adhesive formulation comprising a) a polyurethane composition; and b) a latent catalyst which is the reaction product of i) an amidine-containing compound, a guanidine-containing compound, or an amine-containing compound; ii) carbon dioxide; and iii) water, an alcohol, an amine, or a thiol, is disclosed.

10 Claims, 1 Drawing Sheet

(51) Int. Cl.
*C08G 18/76* (2006.01)
*C08G 18/18* (2006.01)
*B32B 27/40* (2006.01)
*C09J 175/04* (2006.01)
*B32B 27/08* (2006.01)
*B32B 15/08* (2006.01)
*B32B 29/00* (2006.01)
*B32B 27/36* (2006.01)
*B32B 27/34* (2006.01)
*B32B 27/10* (2006.01)
*B32B 15/12* (2006.01)
*B32B 7/12* (2006.01)
*C08G 18/12* (2006.01)
*C08G 18/34* (2006.01)
*C08G 18/66* (2006.01)
*B65D 65/40* (2006.01)

(52) U.S. Cl.
CPC .............. *B32B 27/08* (2013.01); *B32B 27/10* (2013.01); *B32B 27/34* (2013.01); *B32B 27/36* (2013.01); *B32B 27/40* (2013.01); *B32B 29/005* (2013.01); *C08G 18/12* (2013.01); *C08G 18/1875* (2013.01); *C08G 18/348* (2013.01); *C08G 18/4829* (2013.01); *C08G 18/6692* (2013.01); *C08G 18/7664* (2013.01); *C09J 175/04* (2013.01); *B32B 2250/02* (2013.01); *B32B 2255/10* (2013.01); *B32B 2255/205* (2013.01); *B32B 2439/46* (2013.01); *B32B 2553/00* (2013.01); *B65D 65/40* (2013.01); *C08G 2170/00* (2013.01)

(58) Field of Classification Search
CPC ......... B32B 27/10; B32B 27/34; B32B 27/36; B32B 27/40; B32B 29/005; B32B 2250/02; B32B 2250/205; B32B 2255/10; B32B 2439/46; B32B 2553/00; C08G 18/12; C08G 18/1875; C08G 18/348; C08G 18/4829; C08G 18/6692; C08G 18/766; C08G 2170/00; B65D 65/40
See application file for complete search history.

(56) References Cited

U.S. PATENT DOCUMENTS

| | | | |
|---|---|---|---|
| 5,304,578 A * | 4/1994 | Tamano | C08G 18/1875 521/51 |
| 7,977,446 B2 | 7/2011 | Feldman et al. | |
| 8,318,830 B2 | 11/2012 | Kohli Steck et al. | |
| 2006/0135634 A1 | 6/2006 | Guidetti et al. | |
| 2010/0130629 A1* | 5/2010 | Kometani | C08G 18/1808 521/128 |
| 2011/0054140 A1 | 3/2011 | Krause et al. | |
| 2012/0237688 A1 | 9/2012 | Huybrechts et al. | |
| 2012/0263836 A1 | 10/2012 | Carlson et al. | |

OTHER PUBLICATIONS

B. Ochiai, et al., Reversible Trap-Release of CO2 by Polymers Bearing DBU and DBN Moieties, Macromolecules 2008, 41, 1229-1236.
PCT/US2017/014802, International Search Report and Written Opinion dated May 5, 2017.
PCT/US2017/014802, International Preliminary Report on Patentability dated Oct. 2, 2018.

* cited by examiner

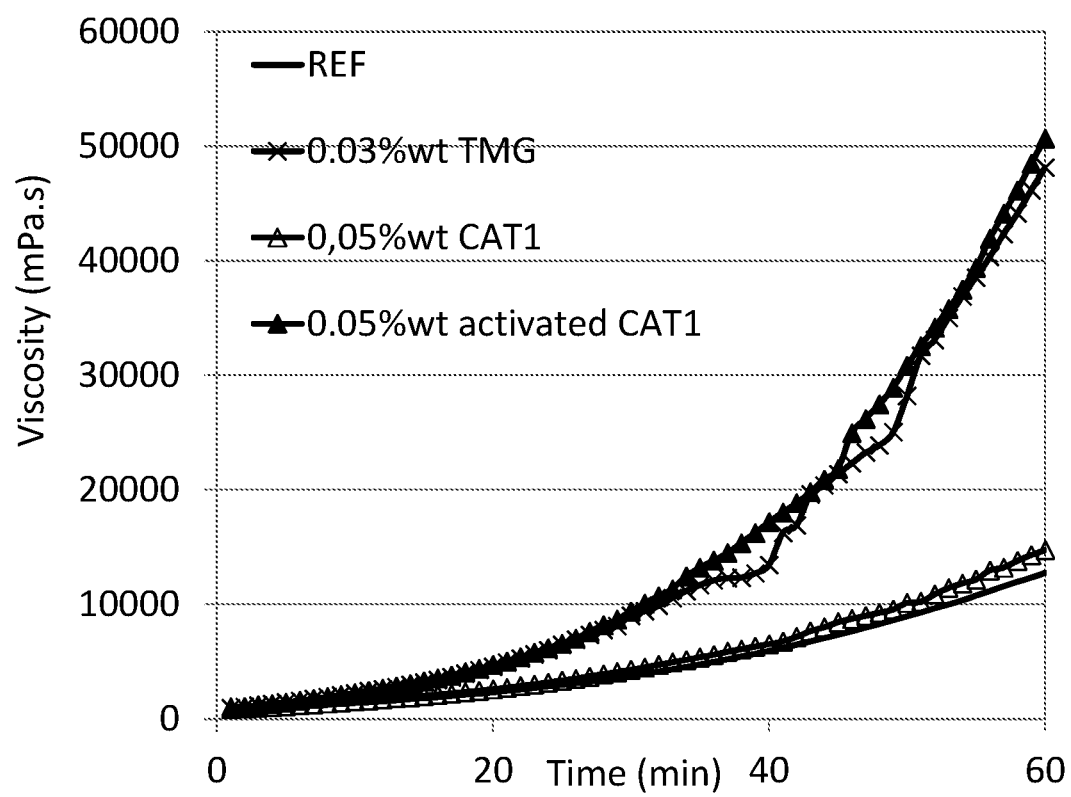

HIGH EFFICIENCY LAMINATING ADHESIVE FORMULATIONS WITH IMPROVED REACTIVITY PROFILE

REFERENCE TO RELATED APPLICATIONS

The present application claims the benefit of U.S. Provisional Application No. 62/314,484, filed on Mar. 29, 2016.

FIELD OF THE INVENTION

The present invention relates to an adhesive formulation and a method of using it in making laminates. In particular, it relates to solvent-less polyurethane adhesive formulations with latent catalysts.

INTRODUCTION

Solventless polyurethane adhesives are a useful class of laminating adhesives. These are liquid compositions that contain a polyisocyanate and a polyol, possibly among other ingredients. They are used in the packaging industry, especially in making food packaging.

However, these adhesives tend to have a short pot-life (from 20 to 40 minutes) and their curing time can be long (up to 10 days for primary aromatic amine (PAA) decay below 2 ppb and full mechanical strength). The ideal reaction profile of solventless polyurethane laminating adhesives would be to have a combination of a long pot life during the lamination process but high reactivity after lamination.

One solution is to use a latent, or delayed catalyst to lengthen the pot life. Organo-metallic-based catalysts have been used as latent catalysts for polyurethane compositions. However, most of these catalysts are tin-based. It is well known and recognized that tin-based catalysts are not recommended for use in food packaging applications. Moreover, the activation conditions (such as time or temperature) for these catalysts are not applicable to the lamination process. Therefore, a latent catalyst for polyurethane laminating adhesives that can be activated in a laminating process and is not organo-metallic-based, is desired.

SUMMARY OF THE INVENTION

In one broad embodiment of the present invention, there is disclosed an adhesive formulation comprising a) a polyurethane composition; and b) a latent catalyst which is the reaction product of i) an amidine-containing compound, a guanidine-containing compound, or an amine-containing compound; ii) carbon dioxide; and iii) water, an alcohol, an amine, or a thiol.

In an alternative embodiment, there is disclosed the adhesive formulation of the previous embodiment, wherein the polyurethane composition comprises from 10 to 40 weight percent of an isocyanate and from 60 to 90 weight percent of a polyol, based on the total dry weight of the polyurethane composition.

In an alternative embodiment, there is disclosed the adhesive formulation of any one of the previous embodiments wherein the catalyst is selected from the group consisting of 1,8-Diazabicycloundec-7-ene, 1,1,3,3-tetramethylguanidine (TMG), and tert-butyl-1,1,3,3, tetramethylguanidine.

In an alternative embodiment, there is disclosed the adhesive formulation of any one of the previous embodiments wherein the catalyst is present in an amount in the range of from 0.0001 to 10 weight percent, based on the total dry weight of the formulation.

In an alternative embodiment, there is disclosed the adhesive formulation of any one of the previous embodiments wherein the polyurethane composition contains a solvent.

In an alternative embodiment, there is disclosed the adhesive formulation of any one of the previous embodiments wherein the polyurethane composition does not contain a solvent.

In an alternative embodiment, there is disclosed a process of making the adhesive formulation of any one of the previous embodiments, said process comprising a) adding the latent catalyst to the polyurethane composition after the polyurethane composition is formed; and
b) activating the latent catalyst.

In an alternative embodiment, there is disclosed a process of the previous embodiment wherein the latent catalyst is activated in step b) using heat, mechanical force, or radiation.

Also disclosed is a laminating adhesive prepared from the adhesive formulation of any one of the previous embodiments, and a flexible package prepared from such laminating adhesive.

BRIEF DESCRIPTION OF THE DRAWING

The FIGURE is a graph showing viscosity vs. time for four samples.

DETAILED DESCRIPTION OF THE INVENTION

The adhesive formulation of the present invention comprises a two component polyurethane adhesive, and a catalyst comprising an amidine or a guanidine.

The adhesive formulation can be solvent-based or solvent-free. If the adhesive formulation is solvent free, it does not contain an organic solvent. In these embodiments, the adhesive formulation comprises less than 4 weight percent, less than 2 weight percent in various embodiments, and less than 1 weight percent in various other embodiments, based on total dry weight of the adhesive formulation, of an organic solvent.

The adhesive formulation can be any formulation which requires a base catalyst. Examples include, but are not limited to, polyurethanes and epoxies.

In various embodiments, the adhesive formulation is a polyurethane which comprises, as polymerized units, an isocyanate and a polyol. Examples of polyols that can be used are polyether polyols and polyester polyols.

The isocyanate generally has a molecular weight Mw of less than 50 g/mol, less than 30 g/mol in various other embodiments, and less than 275 g/mol in various other embodiments.

The isocyanate can be a monomeric aromatic diisocyanate. Examples of monomeric aromatic diisocyanates include, but are not limited to methylene diphenyl diisocyanate (MDI), toluene diisocyanate (TDI), and combinations thereof. TDI can be generally used with any commonly available isomer distributions. The most commonly available TDI has an isomer distribution of 80% 2,4-isomer and 2% 2,6-isomer. TDI with other isomer distributions can also be used. When MDI is used in the preparation of the polyurethane prepolymer, it is generally pure 4,4'-MDI or any combinations of MDI isomers. When combinations of 4,4'-MDI with other MDI isomers are used, the preferred concentration of 4,4'-MDI is from 25% to 75% of all MDI isomers.

The monomeric aromatic diisocyanate is generally present in the polyurethane prepolymer in the range of from 0 to 40 weight percent, based on the total dry weight of the polyurethane prepolymer. Any and all ranges between 0 and 40 are included herein and disclosed herein; for example, the diisocyanate can be present in the polyurethane prepolymer in the range of from 12 to 38 weight percent, or from 15 to 35 weight percent.

The polyether polyol and the polyester polyol each have a weight average molecular weight Mw of from 400 to 400 g/mol, from 750 to 350 g/mol in various other embodiments, and more preferably from 800 to 300 g/mol in various other embodiments. The polyether polyol and the polyester polyol can each have a functionality of from 1.8 to 10, from 1.9 to 3 in various other embodiments, and from 2 to 2.5 in various other embodiments.

Examples of polyether polyols that can be used include, but are not limited to addition polymerization products and the graft products of ethylene oxide, propylene oxide, tetrahydrofuran, and butylene oxide, the condensation products of polyhydric alcohols, and any combinations thereof. Specific examples of the polyether polyols include, but are not limited to polypropylene glycol (PPG), polyethylene glycol (PEG), polybutylene glycol, polytetramethylene ether glycol (PTMEG), and any combinations thereof.

In various embodiments, the polyether polyol is generally present in the polyurethane prepolymer in the range of from 0 to 99 weight percent, based on the total dry weight of the polyurethane prepolymer. Any and all ranges between 0 and 99 are included herein and disclosed herein; for example, the polyether polyol can be present in the polyurethane prepolymer in the range of from 25 to 80 weight percent, or from 30 to 75 weight percent.

The polyester polyols are the condensation products or their derivatives of diols, and dicarboxylic acids and their derivatives.

Specific examples of the diols include, but are not limited to ethylene glycol, butylene glycol, diethylene glycol, triethylene glycol, polyalkylene glycols such as polyethylene glycol, 1,2-propanediol, 1,3-propanediol, 2-methyl-1,3-propandiol, 1,3-butanediol, 1,4-butanediol, 1,6-hexanediol, neopentyl glycol, 3-methyl-1,5-pentandiol, and any combinations thereof. In order to achieve a polyol functionality of greater than 2, triols and/or tetraols may also be used. Specific examples of such triols include trimethylolpropane and glycerol. Specific examples of such tetraols include erythritol and pentaerythritol.

Dicarboxylic acids are selected from aromatic acids, aliphatic acids, and the combination thereof. Suitable examples of the aromatic acids are phthalic acid, isophthalic acid, and terephthalic acid; while suitable examples of the aliphatic acids are adipic acid, azelaic acid, sebacic acid, glutaric acid, tetrachlorophthalic acid, maleic acid, fumaric acid, itaconic acid, malonic acid, suberic acid, 2-methyl succinic acid, 3,3-diethyl glutaric acid, and 2,2-dimethyl succinic acid. Anhydrides of these acids can likewise be used. For the purposes of the present invention, the anhydrides are accordingly encompassed by the expression of term "acid". Preferably, the aliphatic acids and aromatic acids are saturated, and are respectively adipic acid and isophthalic acid. Monocarboxylic acids, such as benzoic acid and hexane carboxylic acid, should be minimized or excluded.

Polyester polyols can be also prepared by addition polymerization of lactone with diols, triols and/or tetraols. Specific examples of lactone include caprolactone, butyrolactone and valerolactone. Specific examples of the diols are ethylene glycol, butylene glycol, diethylene glycol, triethylene glycol, polyalkylene glycols such as polyethylene glycol, 1,2-propanediol, 1,3-propanediol, 2-methyl 1,3-propandiol, 1,3-butanediol, 1,4-butanediol, 1,6-hexanediol, neopentyl glycol, 3-methyl 1,5-pentandiol and any combinations thereof. Specific examples of triols include trimethylolpropane and glycerol. Specific examples of tetraols include erythritol and pentaerythritol.

In various embodiments, polyester polyols can be present in the polyurethane prepolymer in the range of from 0 to 99 weight percent, based on total dry weight of the polyurethane prepolymer. Any and all ranges between 0 and 99 weight percent are included herein and disclosed herein, for example, the prepolymer can contain from 18 to 28 weight percent polyester polyol, or from 20 to 25 weight percent polyester polyol.

The preparation of the polyurethane prepolymer can be done in any way that is known to those of ordinary skill in the art, and includes condensation polymerization. Organic solvent is not used in the preparation of the polyurethane prepolymer.

The latent catalyst is added into the polyurethane dispersion under stirring to form a stable mixture.

The latent catalyst is the complex formed by the reaction of an amidine- or guanidine-based compound with carbon dioxide and water, an alcohol, an amine, or a thiol. Any alcohol can be used, but in various embodiments, 1-ethanol, propan-2-ol, 1-octanol, or ethylene glycol are used.

The amidine-based compound has a general structure as depicted in Formula I, below.

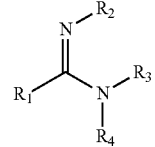

Formula I where $R_1$, $R_2$, $R_3$, and $R_4$ are independently selected from the group consisting of hydrogen, methyl, ethyl, propyl, isopropyl, butyl, isobutyl, and cyclic structures.

The guanidine-based compound has a general structure as depicted in Formula II, below.

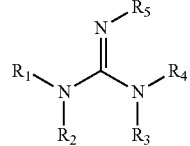

Formula (II)

where $R_1$, $R_2$, $R_3$, $R_4$, and $R_5$ are independently selected from the group consisting of hydrogen, methyl, ethyl, propyl, isopropyl, butyl, isobutyl, and cyclic structures.

Suitable examples of amidine-based compounds include, but are not limited to (1,8-Diazabicycloundec-7-ene) (DBU).

Suitable examples of guanidine-based compounds include, but are not limited to 1,1,3,3-tetramethylguanidine (TMG), and tert-butyl-1,1,3,3, tetramethylguanidine.

In place of amidine or guanidine-based compounds, amine based compounds can be used. Examples of amine-based compounds include, but are not limited to ethylene diamine, diethylene triamine, and aminopropyltriethoxy silane.

The latent catalyst is generally used in an amount in the range of from 0.0001 to 10 weight percent, based on the total weight of the formulation. Any and all ranges between 0.0001 and 10 weight percent are included herein and disclosed herein; for example, the latent catalyst can be present in an amount in the range of from 0.1 and 5 weight percent or from 0.5 to 3 weight percent.

In various embodiments, the formulation can also contain tackifiers, fillers, adhesion promoters, dyes, and/or solvents. However, the formulation cannot contain acidic compounds.

The adhesive formulation is applied onto the surface of at least one substrate. The substrate is generally selected from the group consisting of a polymer film, a metalized polymer film, a foil, a polymer-backed metal foil, paper, and combinations thereof. including metal foils, polyester films, and nylon films. A second substrate can then be laminated to the first substrate.

The catalyst of the adhesive formulation can be activated when coated on the first substrate or second substrate. Examples of how the catalyst can be activated include, but are not limited to heat (such as microwave or infrared heat), mechanical force or radiation. If heat is used, the catalyst is generally activated at a temperature in the range of from 30 to 200° C. but in various other embodiments from 50 to 100° C.

The laminate may be part of a thicker laminate comprising additional substrates and additional adhesive formulations. The additional substrates can be the same or different from the films comprised in the laminate of the present invention. The additional adhesive formulations can be the same or different from the adhesive formulation of the present invention, and can be any commonly used adhesive formulations in the laminate industry.

EXAMPLES

Preparation of Blocked Catalyst Based on TMG

An equimolar mixture of 1,1,3,3-tetramethylguanidine (TMG) and water was dissolved in acetonitrile (1 vol mixture/1 vol acetonitrile) and introduced in a test tube. Carbon dioxide, created by reaction of phosphoric acid dropped on calcium carbonate, was allowed to bubble in the test tube. The blocking reaction was run for 1 to 2 hours at room temperature. At the end of the reaction, TMG-based alkylcarbonate salts, insoluble in acetonitrile, were filtered and washed with an excess of acetonitrile. The salts were allowed to dry in the filter paper under the hood overnight and analyzed without further purification. The activation temperature range was determined to be from 80 to 13° C. The activation time at 9° C. was determined to be 30 minutes.

Viscosity curves, determined by viscosity measurements, were run with a general performance system (MOR-FREE 698A+C79). MOR-FREE 698A is a prepolymer based on pure 4,4'-MDI and isomeric MDI. C79 is a blend of castor oil and a polyether triol.

Reactivity curves were run at 4° C. for 1 hour for the following systems:
Reference: MOR-FREE 698A+C79 100/50
Inactive catalyst (CAT1): MOR-FREE 698A+C79 mixed 100/50+0.05 wt % of inactive TMG-based catalyst (prepared above) and stirred for 1 min
Active catalyst (Activated CAT1): MOR-FREE 698A+C79 mixed with 0.05 wt % of activated TMG-based catalyst 100/50 stirred for 1 min
TMG reference: MOR-FREE 698A+C79 mixed 100/50+0.03 wt % of TMG stirred for approximately 1 min The activation of the TMG-based catalyst was done by heating a mixture of C79 and the catalyst at 9° C. for 1 hour. Then MOR-FREE 698A was added and the viscosity of the final blend was measured.

Referring to the FIGURE, CAT1 can be inactive at 40° C. for 1 hour. After activation, CAT1 displays similar catalytic activities as TMG.

The invention claimed is:

1. An adhesive formulation comprising
   a) a polyurethane composition; and
   b) a latent catalyst which is the reaction product of
      i) an amidine-containing compound, a guanidine-containing compound, or an amine-containing compound;
      ii) carbon dioxide; and
      iii) an alcohol, an amine, or a thiol.

2. The adhesive formulation of claim 1, wherein the polyurethane composition comprises from 10 to 40 weight percent of an isocyanate and from 60 to 90 weight percent of a polyol, based on the total dry weight of the polyurethane composition.

3. The adhesive formulation of claim 1 wherein the amidine-containing compound or the guanidine-containing compound is selected from the group consisting of 1,8-Diazabicycloundec-7-ene, 1,1,3,3-tetramethylguanidine (TMG), and tert-butyl-1,1,3,3, tetramethylguanidine.

4. The adhesive formulation of claim 1, wherein the catalyst is present in an amount in the range of from 0.0001 to 10 weight percent, based on the total dry weight of the formulation.

5. The adhesive formulation of claim 1, wherein the polyurethane composition contains a solvent.

6. The adhesive formulation of claim 1, wherein the polyurethane composition does not contain a solvent.

7. A process of making the adhesive formulation of claim 1, said process comprising
   a) adding the latent catalyst to the polyurethane composition after the polyurethane composition is formed; and
   b) activating the latent catalyst.

8. A process in accordance with claim 7, wherein the latent catalyst is activated in step b) using heat, mechanical force, or radiation.

9. A laminating adhesive prepared from the adhesive formulation of claim 1.

10. A flexible package prepared from the laminating adhesive of claim 9.

* * * * *